Feb. 21, 1956  R. W. McCLENDON  2,735,252
LAWN EDGER

Filed Nov. 23, 1955  2 Sheets-Sheet 1

Robert W. McClendon
INVENTOR.

BY *Clarence A. O'Brien*
*and Harvey B. Jackson*
Attorneys

Feb. 21, 1956 R. W. McCLENDON 2,735,252
LAWN EDGER
Filed Nov. 23, 1955 2 Sheets-Sheet 2
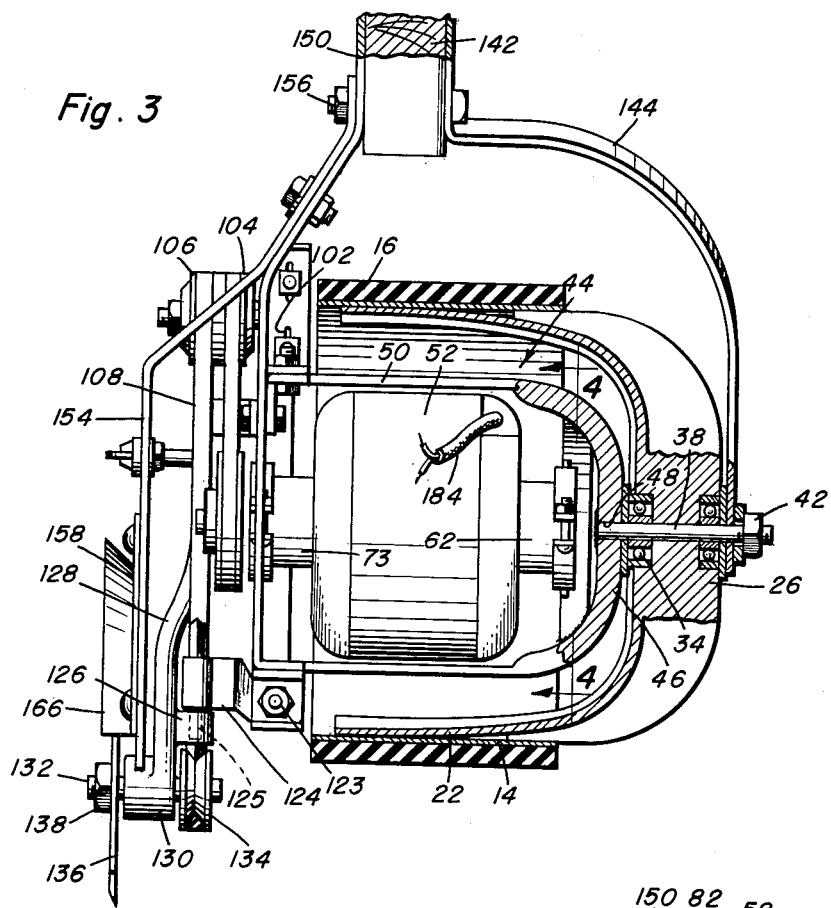
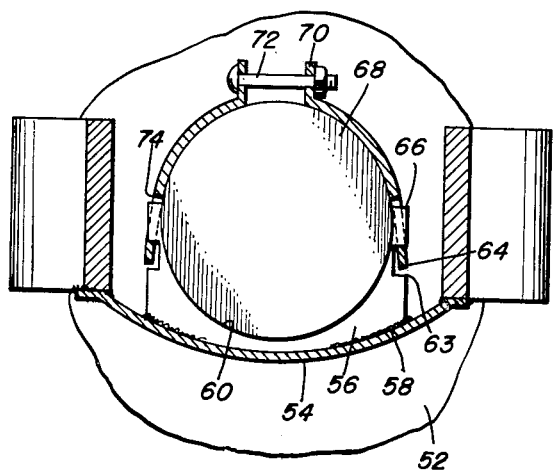
Fig. 4
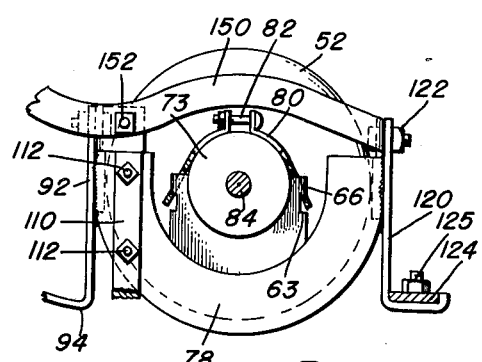
Fig. 5
Robert W. McClendon
INVENTOR.
BY *Clarence A. O'Brien*
*and Harvey B. Jacobson*
Attorneys

United States Patent Office 2,735,252
Patented Feb. 21, 1956

2,735,252
LAWN EDGER

Robert W. McClendon, Corpus Christi, Tex.

Application November 23, 1955, Serial No. 548,694

8 Claims. (Cl. 56—25.4)

This invention generally relates to a lawn edge and trimmer and more specifically provides a compact and readily maneuverable device for trimming grass along the edges of a lawn which normally is inaccessible to a regular lawn mower, such as alongside of sidewalks, adjacent buildings, curbs, around flower beds and the like.

Specifically, this application forms a continuation-in-part of my copending application Serial No. 412,894, filed February 26, 1954, now abandoned.

The primary object of this invention is to provide a lawn edger and trimmer employing a motor for rotating a grass cutting blade wherein the motor, cutting blade, driving connections, a suitable handle and other necessary parts are mounted on a steel frame and is supported or carried by one ground engaging wheel mounted on said frame wherein the novel design of said frame and wheel when used in combination, produce new features and advantages that permit the edger to be controllable and maneuverable to such a high degree that the edger will operate with the same ease and efficiency on all edges whether straight, curved or circles (such as around flower beds), thus making it easy to maintain a lawn with neat borders and precision-cut edges.

Other objects of the present invention will reside in its simplicity and ruggedness of construction, ease of assembly and repair, adaptation for its particular purposes, safety, and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a plan sectional view, with portions being shown in elevation for clarity, taken substantially upon a plane passing along section line 3—3 of Figure 2 illustrating the frame for supporting the motor within the wheel together with the driving mechanism for driving the cutter;

Figure 1:
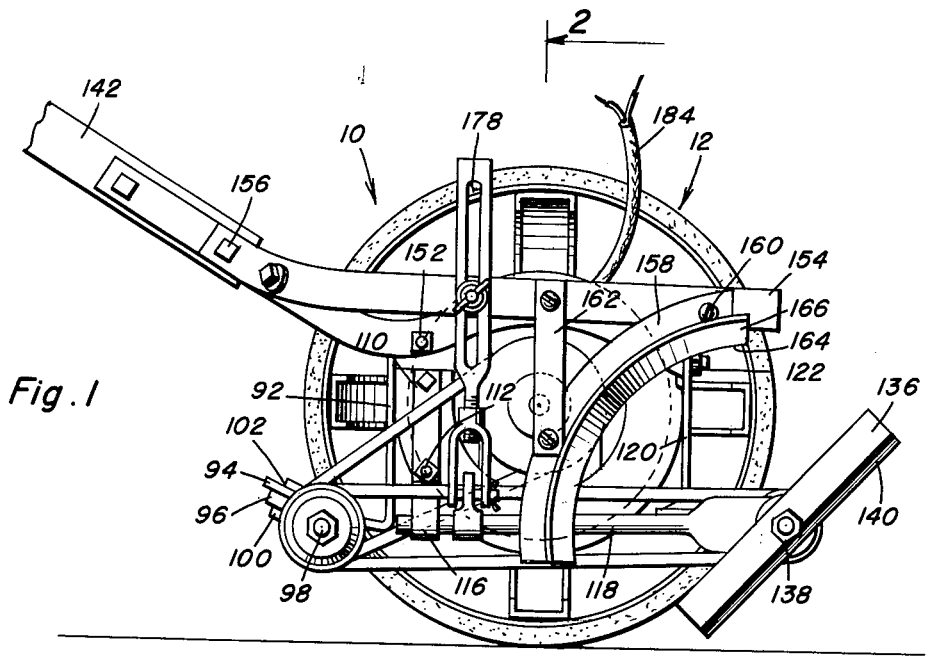
Figure 1 is an end elevational view illustrating the construction of the present invention with the handle being broken away.
Figure 2:
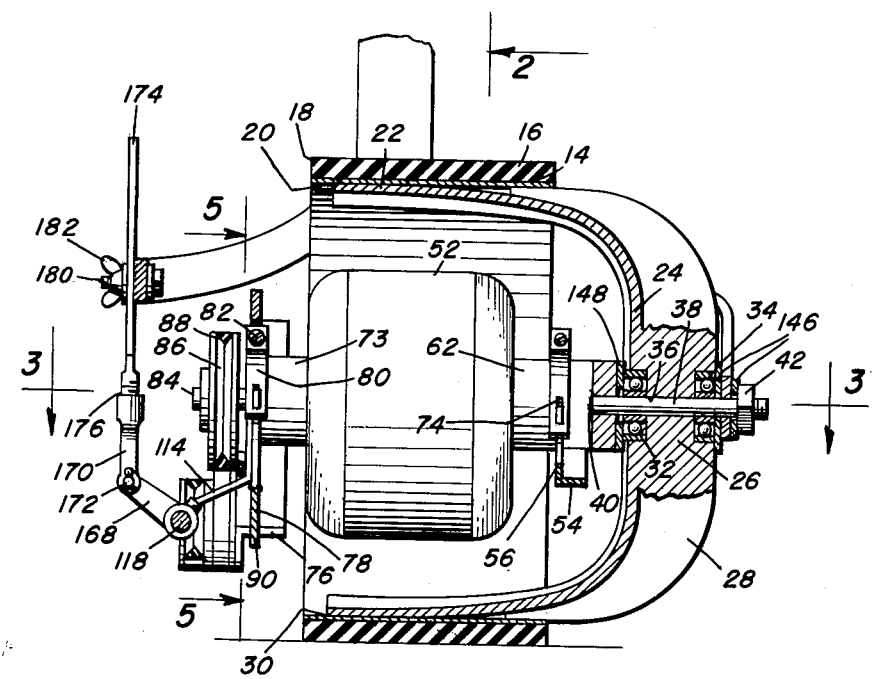
Figure 2 is a vertical sectional view taken substantially upon a plane passing along section line 2—2 of Figure 1 illustrating the wheel construction and other details of the driving connection and the adjusting means for the cutter.

Figure 4 is a detailed sectional view of an enlarged scale taken substantially upon a plane passing along section line 4—4 of Figure 3 illustrating the details of the clamp mechanism for mounting the motor on the supporting frame; and Figure 5 is a detailed sectional view on an enlarged scale taken substantially upon a plane passing along section line 5—5 of Figure 2 illustrating the details of the clamp means at the opposite end of the motor and frame from Figure 4.

With reference to the official drawings, it will be seen that the numeral 10 generally designates the lawn edger of the present invention which includes a wheel generally designated by the numeral 12 which is cup-shaped or dish-shaped.

The wheel 12 includes a steel rim 14 with a solid rubber tire 16 on the outer surface thereof wherein the rim 14 and tire 16 are flat on their outer and inner surfaces and define a relatively wide ground engaging surface wherein the wheel 12 will have considerable lateral stability and will normally be disposed in an upright condition when supported on substantially a level supporting surface. The tire 16 may be constructed of hard rubber which is molded on or bonded to the rim 14 in any suitable manner. The outer flat peripheral surface of the tire 16 is designated by the numeral 18 and the inner surface of the rim 14 is designated by the numeral 20.

Secured to the inner surface 20 of the rim 14 is a plurality of generally channel-shaped spokes 22 which extend longitudinally outwardly beyond the wheel 12 and are curved laterally inwardly as designated by the numeral 24 and terminate in a central hub portion 26. The area between the hub portion 26 and the spokes 22 is provided with a reinforcing rib 28 in perpendicular relation to the inwardly extending portion 24 of the spokes 22. The spokes 22 may be secured to the inner surface of the wheel rim 14 by any suitable means such as by welding 30.

The hub 26 is provided with cylindrical recesses 32 in the outer faces thereof for receiving a ball bearing assembly 34. The hub 26 also has a bore 36 extending therethrough for receiving a fastening bolt 38. The fastening bolt 38 is provided with a welded end 40 and a removable nut 42 with the removable nut exposed exteriorly of the hub 26 remote from the wheel 12.

A generally U-shaped frame designated by the numeral 44 is provided with a bight portion 46 having a bore 48 in alignment with the bore 36 in the hub 26 for receiving the bolt 38 thereby securing the frame 44 to the hub 26 for supporting the frame 44 within the wheel 12. The ball bearing assemblies 34 permit the wheel hub 26 to rotate in relation to the frame 44. The frame 44 also includes a pair of parallel leg members 50 which extend along diametric opposed sides of an electric motor 52. A transverse member 54 extends between the legs 50 of the frame 44 adjacent the bight portion 46 in parallel relation to the bight portion 46 and the transverse member 54 includes an upstanding plate 56 secured to the arcuate transverse member 54 as by welding 58. The upper edge 60 of the plate 56 is arcuate for conforming to and receiving the projecting cylindrical bearing housing 62 of the motor 52. The plate 56 is also provided with generally vertically disposed side edges 63 having notches or recesses 64 therein which define projections 66 on the free ends of the plate 56. A pair of clamp members 68 generally arcuate in form are provided with upstanding lugs 70 for receiving a clamp screw 72 and are in engagement with the peripheral surface of the cylindrical housing 62. The lower or free ends of each of the clamp members 68 is provided with a slot 74 for positioning over the projection 66 thereby detachably securing the clamp member 68 to the plate 56 so that the clamp screw 72 may be employed for rigidly clamping the cylindrical housing 62 to the supporting frame 44 so that the motor 52 will be supported with its driving shaft in substantially horizontal position. The other end of the motor 52 is provided with an identical cylindrical boss 73 together with curved transverse member 76 similar to the curved transverse member 54 but which is provided with a deeper curve and is spaced further from the boss 73 which is identical with the cylindrical housing or boss 62. An upstanding plate 78 is provided on the transverse member 76 to which a pair of clamp members 80 are detachably engaged and provided with a clamp screw 82 which are identical to the clamp members 68 and the clamp screw 72 whereby the motor 52 will be rigidly supported in the frame 44 and the frame 44 will be rotatably supported on the hub 26 of the supporting wheel 12 whereby the supporting wheel 12 may rotate without rotating the motor 52.

As will be specifically illustrated in Figure 2, the end of the motor 52 remote from the hub 26 is provided with a projecting drive shaft 84 to which is attached a V-belt pulley 86 having a V-belt 88 disposed thereon in substantially encircling relation wherein the V-belt 88 will be driven by the electric motor 52.

Secured to the outer edge 90 of the arcuate plate 78 is a vertically disposed supporting strap 92 having a rearwardly extending angulated end strap 94 to which is attached a mounting block 96 supporting a stub shaft 98. Fastener bolts 100 secure the mounting block 96 to the end 94 of the strap 92 with slots 102 being provided in the member 94 to permit movement of the shaft 98. The shaft 98 is provided with the first V-belt pulley 104 in alignment with the V-belt pulley 86 for receiving the V-belt 88 for driving the pulleys. A second V-belt pulley 106 is provided on the shaft 98 rigid with pulley 104 and an elongated endless V-belt 108 is provided in encircling relation to the V-belt pulley 106 for a purpose described hereinafter.

A depending supporting strap 110 is attached to the outer face of the plate 78 by fastening member 112 and terminates in an outwardly extending angulated end portion 114 having a sleeve 116 thereon journaling an elongated supporting arm or rod 118 for rotation about its longitudinal axis. The supporting arm 118 generally is disposed in parallel relation with the V-belts 88 and 108. The end of the arm 118 remote from the bracket 119 is supported by a bracket 120 extending downwardly from the outer edge of the supporting plate 78 and the bracket 120 is mounted by a fastening bolt 122 and terminates in an outwardly extending portion 124 attached by bolt 123 and having an arm 125 received in a sleeve 126 journaling the arm 118 which is provided with an offset portion 128 adjacent the center thereof and provided with a transverse boss 130 on the outer end which rotatably receives a shaft 132 extending therethrough which is provided with a V-belt pulley 134 on the inner end thereof for receiving the V-belt 108. The other end of the shaft 132 is provided with a cutter 136 detachably secured in position by a clamp nut 138 threaded onto the end of the shaft 132. With this arrangement, the rotational movement of the drive shaft 84 of the motor 52 will be transmitted through the pulley 86 to the V-belt 88 to the pulley 104, its mating pulley 106, V-belt 108, pulley 134, shaft 132 and the cutter 136 which may be provided with sharpened edges 140 for rotational movement for engaging and cutting grass alongside obstructions such as side walks, buildings or the like wherein the grass is normally inaccessible.

For controlling and maneuvering the lawn mower 10, an elongated handle 142 is provided and a bracket member 144 is attached to one side thereof and extends arcuately around the wheel 12 for positioning on the axle 38 and held thereon by the nut 42. A friction washer 146 is disposed between the nut 42 and the end of the bracket 144 and between the bracket 144 and the hub 26. Also, a friction washer 148 is disposed between the hub 26 and the bight portion 46 of the frame 44 for assuring proper rotational movement of the wheel 12 in relation to the frame 44 and the handle brackets 144. On the other side of the handle 142 is a bracket 150 extending forwardly and being attached to the upper ends of plate 76 by fastening bolts 152 thereby rigidly securing the bracket 150 to the frame 44 whereby pivotal movement of the handle 142 in a vertical plane will cause rotational movement of the frame 44 and the rotational movement of the frame 44 will cause vertical swinging movement of the cutter supporting arm 118 thereby raising and lowering the cutter 136 in relation to the ground surface to facilitate the cutting operation and control the device accurately.

A second bracket 154 is provided on the handle 142 and all the brackets are secured by a common bolt 156. The second bracket 154 extends in generally parallel relation to the bracket 150 and is rigidly secured thereto. A generally arcuate guard or deflector 158 is mounted on the outer end of the bracket 154 by a screw threaded fastener 160 and a depending supporting strap 162. The downwardly facing edge of the guard 158 designated by the numeral 164 is arcuate and is provided with an outwardly flared portion 166 for deflecting the grass cut by the cutter 136 outwardly away from the operator of the device.

The cutter supporting arm 118 is provided with an offset link 168 to which is pivotally attached a U-shaped yoke 170 by a pivot pin 172. The yoke 170 is screw threadedly adjustably attached to a vertical member 174 with the screw threaded adjustment designated by the numeral 176. The vertical member 174 is provided with an elongated slot 178 slidably positioned over a bolt 180 extending through the bracket 154 and provided with a wing nut 182 to longitudinally adjust the member 174 in relation to the bracket 154 thereby adjusting the angular position of the cutter 136 by rotating the arm 118 about its longitudinal axis. The slight angular movement caused by the arc of the link 168 will be permitted due to the slot and pin connection formed by the bolt 180 and nut 182 which will permit limited variations in the angular relation of the vertical member 174. As the arm 118 is rotated about its longitudinal axis, the cutter 136 will rotate to an inclined vertical axis and the V-belt pulley 108 will be twisted somewhat but will operate in the usual manner. This will permit the cutter bar 136 to trim lawn edges on an angle or be positioned in substantially a horizontal position for trimming the top surface of a lawn as desired.

The rigid connection between the handle 142 and the supporting frame 44 permits accurate and positive control of the position of the cutter bar or cutter blade 136 and the ball bearing assemblies 34 permit easy rolling of the support wheel 12. Due to the particular construction of the supporting wheel 12, substantial lateral stability is given to the lawn edger 10 and by proper twisting movement of the handle 142, the lawn edger 10 may be accurately controlled in an angular plane as well as in a vertical plane. It will be understood that any suitable type of electric motor 52 may be employed and a suitable heavy duty electrical conductor 184 may be employed for use in conjunction with a suitable male plug (not shown) for insertion into a suitable electrical female plug (not shown). From the foregoing, the operation of the device will be readily understood. Briefly, the supporting wheel 12 engages any suitable supporting surface such as a side walk with the cutter blade 136 disposed generally along the edge of the side walk. As the motor 52 is actuated, the shaft 84 will transmit rotational force to the blade 136 as previously described for rotating the same. By varying the vertical elevation of the handle 142, the vertical position of the blade 136 may be varied for determining the cutting characteristics of the blade 136. By suitable twisting and guiding movement of the handle 142, the direction of movement of the mower 10 may be easily varied as desired. The lateral width of the supporting wheel 12 will provide lateral stability for the device while it is on substantially level ground and the ball bearing support between the wheel 12 and the supporting frame 44 permits easy rolling movement of the lawn edger with little expenditure of effort. By loosening the wing nut 182, the plane of rotation of the blade 136 may be varied as desired to permit the lawn edge to be cut at an angle or to permit the blade to cut in substantially a horizontal plane.

The bolt or axle 38 is actually constructed of a hardened steel member or of a similar material and is rigid with the frame for rotatably supporting the wheel. The particular orientation of the motor and wheel disposes the center of the wheel directly coincident with the center of gravity of the entire device so that the same will be properly balanced and easily maneuverable.

It is an edger and trimmer consisting of rigid steel frame with a suitable handle rigidly mounted on said frame and extending to the rear of the edger, a motor is mounted in said frame, a cutter with driving connections and other associated parts are mounted on one end of said frame and the other end of the frame has a wheel mounted thereon. Said wheel includes a rim with a rubber tire thereon, a central hub, a plurality of spokes being curved in a manner as to form a wheel dish shaped to the extent that said rim and tire encircles the center of said frame and motor and rotates around the center of the frame and motor as the hub rotates around the spindle or shaft on one end of the frame.

This novel design and arrangement of the wheel and frame provides some new and important features. The edger is balanced on one wheel yet it rides at the proper low level for the most efficient operation. The dish-shape of the wheel puts the weight of the entire device on the ground at a point directly under the center of the device. Thereby, the machine will easily pivot at this point in a horizontal plane. The handle extends backwards, and the cutter slightly forward of this pivoting point providing a vertical pivoting action. By virtue of the said vertical and horizontal pivoting action, the operator has positive control of all the functions and operations of this edger by simple easy movements of the handle. The edger will operate around circles with the same ease and efficiency that it will on a straight edge.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A lawn edger comprising a frame having a handle connected thereto, said frame having a motor mounted thereon, a dish-shaped wheel encircling and rotatably supporting said frame and motor, a cutter supporting arm connected to said frame, a cutter rotatably mounted on said arm, and driving connection between said motor and said cutter.

2. The combination of claim 1 wherein said cutter supporting arm is mounted for adjustment about its longitudinal axis for varying the plane of rotation of the cutter.

3. The combination of claim 1 wherein said frame includes a generally U-shaped yoke, said handle being rigidly connected to said yoke for moving the cutter in a vertical plane when the handle is moved in a vertical plane.

4. The combination of claim 1 wherein said wheel includes a cylindrical rim and tire having substantial width and being longitudinally flat on the outer peripheral surface thereof, a central hub disposed in longitudinally spaced relation to the rim, and a plurality of arcuate spokes interconnecting the rim and hub.

5. The combination of claim 1 wherein said frame includes a generally U-shaped member having a pair of transverse plates, said plates supporting said motor, and clamp means for holding the motor to the plates.

6. The combination of claim 1 wherein said driving connection includes a plural V-belt arrangement, and means for adjusting the tension on the V-belts.

7. The combination of claim 1 wherein said frame and motor are disposed with the center of gravity of the edger disposed in a vertical plane passing through the center of the wheel.

8. The combination of claim 1 wherein the design of said frame permits all parts thereon to be mounted in the proper arrangement, wherein said motor is mounted in center of said frame, said supporting wheel is mounted on one side of said frame, and said cutter, said cutter supporting arm, said driving connection and other relating parts are all mounted on the side of said frame that is opposite the side onto which said supporting wheel is mounted, thereby permitting the use of said dish-shaped wheel wherein said rim and tire encircles the center of said frame and said motor, and rotates around the center of said frame.

References Cited in the file of this patent
UNITED STATES PATENTS

| | | |
|---|---|---|
| 1,674,847 | Watson | June 26, 1928 |
| 2,630,665 | Lauer | Mar. 10, 1953 |